United States Patent
Shimizu et al.

[11] Patent Number: 6,072,293
[45] Date of Patent: Jun. 6, 2000

[54] STEERING CONTROL SYSTEM FOR VEHICLE

[75] Inventors: Yasuo Shimizu; Katsuhiro Sakai, both of Wako, Japan

[73] Assignee: Honda Giken Kogyo Kabushiki Kaisha, Tokyo, Japan

[21] Appl. No.: 09/107,450

[22] Filed: Jun. 30, 1998

[30] Foreign Application Priority Data

Jul. 1, 1997 [JP] Japan ................................. 9-175468

[51] Int. Cl.[7] ....................................................... H02P 7/00
[52] U.S. Cl. ..................... 318/432; 310/434; 310/466; 388/831; 388/829; 388/915
[58] Field of Search .................... 318/432, 434, 318/466, 293; 180/79.1; 388/831, 829, 915

[56] References Cited

U.S. PATENT DOCUMENTS

| | | | |
|---|---|---|---|
| 4,961,474 | 10/1990 | Daido et al. | 180/79.1 |
| 5,040,629 | 8/1991 | Matsuoka et al. | 180/79.1 |
| 5,405,960 | 4/1995 | Wada et al. | 180/79.1 |
| 5,460,235 | 10/1995 | Shimizu | 318/434 |
| 5,563,790 | 10/1996 | Wada et al. | 180/446 |
| 5,602,735 | 2/1997 | Wada | 180/446 |
| 5,623,409 | 4/1997 | Miller | 318/434 |
| 5,698,956 | 12/1997 | Nishino et al. | 318/432 |
| 5,752,209 | 5/1998 | Nishimoto et al. | 318/434 |
| 5,881,836 | 3/1999 | Nishinmoto et al. | 318/434 |

FOREIGN PATENT DOCUMENTS 3-74256  3/1991  Japan .
4-55168  2/1992  Japan .

*Primary Examiner*—Karen Masih
*Attorney, Agent, or Firm*—Arent Fox Kintner Plotkin & Kahn PLLC

[57] ABSTRACT

It is an object of the present invention to provide a steering control system which can be used with a plurality of control modes, thereby reducing the cost. A first control unit of an electric power-steering system detects a reference current $i_{REF}$ on the basis of a steering torque T detected by a steering torque detecting device $S_2$; searches a gain $K_1$ on the basis of a vehicle speed v detected by a vehicle speed detecting device, and carries out a feedback control, so that an actual current i of an electric motor detected by a current detecting device is equal to $K_1 \times i_{REF}$. A second control unit added to the first control unit changes the characteristic of the electric power-steering system by changing the steering torque T and the vehicle speed v, to output the changed steering torque T and vehicle speed v to the first control unit.

10 Claims, 9 Drawing Sheets

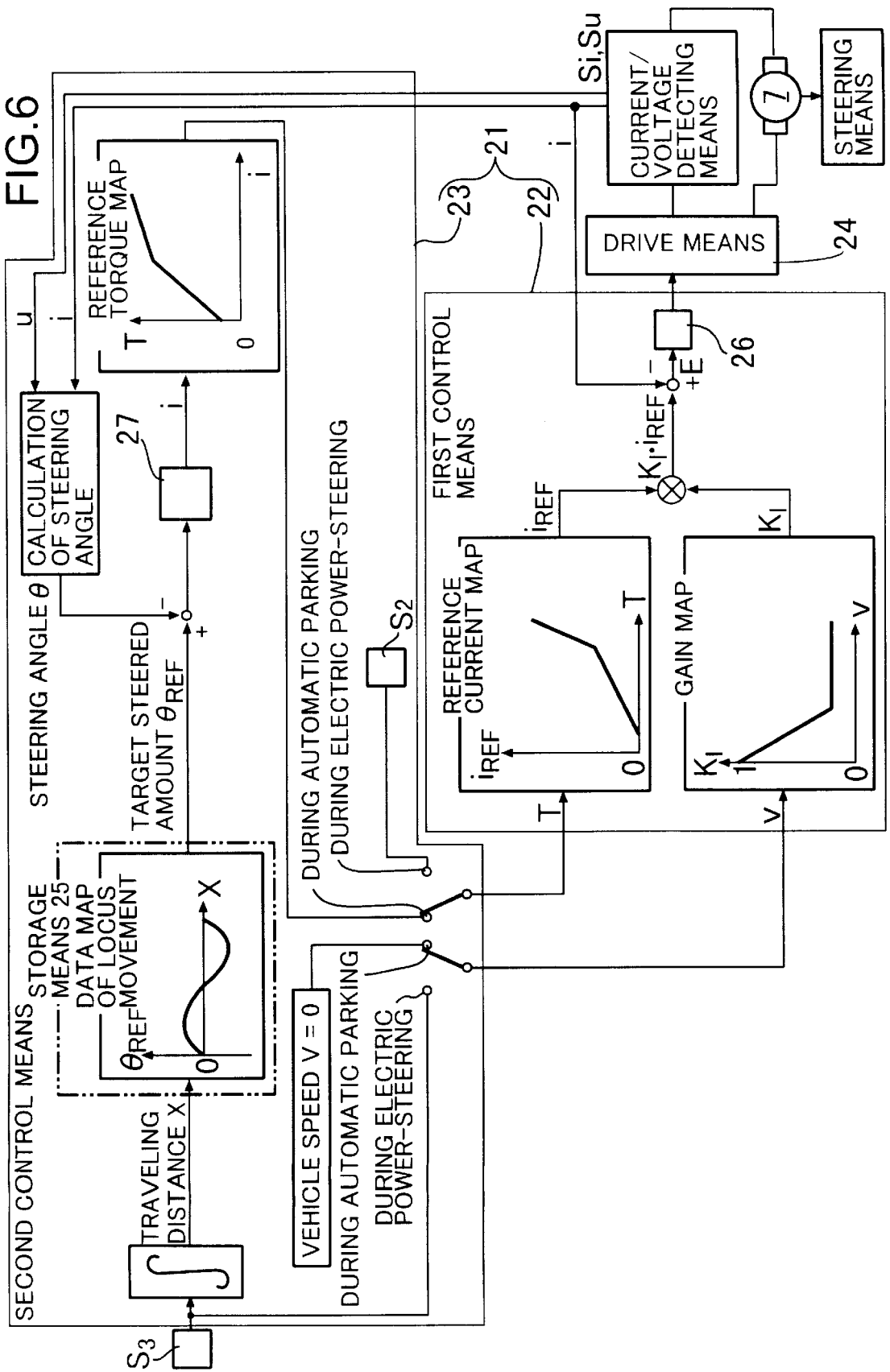

u:TERMINAL VOLTAGE
i :SUPPLIED CURRENT
R:RESISTANCE
L:INDUCTANCE
e:COUNTER ELECTROMOTIVE FORCE
$\alpha$ :ROTATIONAL ANGLE

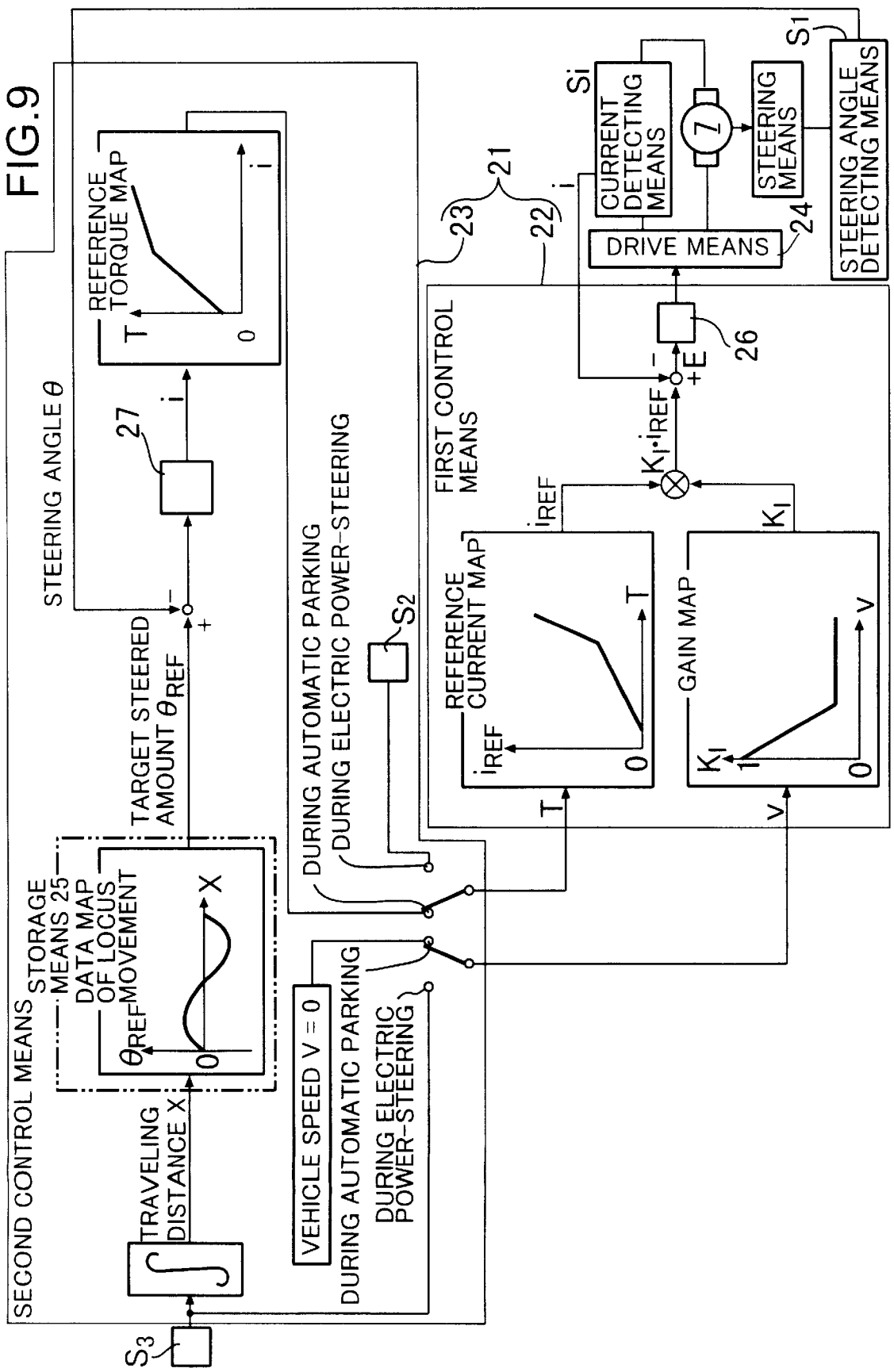

STEERING CONTROL SYSTEM FOR VEHICLE

BACKGROUND OF THE INVENTION

1. Field of the Invention

The present invention relates to a steering control system for a vehicle for carrying out steering operation using an electric motor.

2. Description of the Prior Art

Electric power-steering systems designed to assist in a driver's steering operation using an electric motor are well-known. Automatic steering systems for a vehicle are also already known from Japanese Patent Application Laid-Open Nos. 3-74256 and 4-55168, which are designed to automatically carry out reverse parking or longitudinal parking by utilizing an electric motor of a well-known power-steering system and by controlling the electric motor on the basis of the relationship between the traveling distance of the vehicle and the steering angle that are previously stored.

The known electric power-steering system has a problem in that the characteristic such as the magnitude of the assisting force of such system and the like is determined at the stage of designing of a control system, and if the characteristic is changed, it is necessary to replace the entire control system, resulting in an increased cost. The power steering system and the automatic steering system have many hardware parts commonly used in both of them. However, if the function of the automatic steering system is to be added to the electric power steering system, a control device for the electric power steering system is not used, and it is necessary to mount a control device for the electric power steering system and the automatic steering system. In this case, there is a problem that a lot of time and an increased cost are required for the development of a new control device.

SUMMARY OF THE INVENTION

The present invention has been accomplished with the above circumstance in view, and it is an object of the present invention to provide a steering control system which can be used with a plurality of control modes thereby reducing the cost of the system.

To achieve the above object, according to the present invention, there is provided a steering control system for a vehicle, comprising an electric motor for steering a wheel, a steering amount detecting means for detecting the steering amount provided by a driver's steering operation, a vehicle speed detecting means for detecting the vehicle speed, and an operational state detecting means for detecting the operational state of the electric motor. A first control means controls the electric motor on the basis of the steering amount, the vehicle speed and the operational state, and the steering control system further includes a second control means for controlling the first control means.

With the above arrangement, it is possible to control the electric motor in different modes by utilizing a control means for an existing electric power steering system without modification of the first control means, thereby reducing the time and cost required for the development of the control means.

In addition, the second control means controls the first control means on the basis of the steering amount detected by the steering amount detecting means. With the above arrangement, the assisting characteristic of the electric power steering system can be easily changed.

The second control means can also control the first control means on the basis of the vehicle speed detected by the vehicle speed detecting means. Thus, in the above arrangement, the assisting characteristic of the electric power steering system can be easily changed.

In addition, the second control means includes a movement locus setting means which stores or calculates a locus of movement of the vehicle, and the second control means controls the first control means to move the vehicle along the locus of movement. It is therefore possible to utilize the first control means which is common to the electric power-steering system adapted to assist in a driver's steering operation and the automatic steering system adapted to move the vehicle along the set locus of movement, thereby reducing the time and cost required for the development of the control means.

The locus of movement is represented as the relationship of a reference steering angle of the wheel relative to the traveling distance of the vehicle, and the second control means controls the first control means to move the vehicle along the locus of movement on the basis of (1) the traveling distance of the vehicle calculated based on the vehicle speed, (2) the steering angle of the wheel assumed based on the operational state of the electric motor, and (3) the locus of movement. The vehicle speed and the operational state of the electric motor can thus be used for the control of the electric power-steering system and can be also used for the control of the automatic steering system The locus of movement can also be represented as the relationship of a reference steering angle of the wheel relative to the traveling distance of the vehicle, and the second control means controls the first control means to move the vehicle along the locus of movement on the basis of (1) the traveling distance of the vehicle calculated based on the vehicle speed, (2) the steering angle of the wheel detected by a steering angle detecting means, and (3) the locus of movement. The steering angle can thus be accurately detected to accurately move the vehicle along the locus of movement by detecting the steering angle of the wheel using the steering angle detecting means, as compared with the case where the steering angle of the wheel is assumed on the basis of the operational state of the electric motor.

BRIEF DESCRIPTION OF THE DRAWINGS

The mode for carrying out the present invention will now be described by way of embodiments shown in the accompanying drawings.

FIG. 6 is a diagram showing the arrangement of a steering control system according to a fourth embodiment of the present invention.

FIG. 9 is a diagram showing the arrangement of a steering control system according to a fifth embodiment of the present invention.

DETAILED DESCRIPTION OF THE PREFERRED EMBODIMENTS

Figure 1:
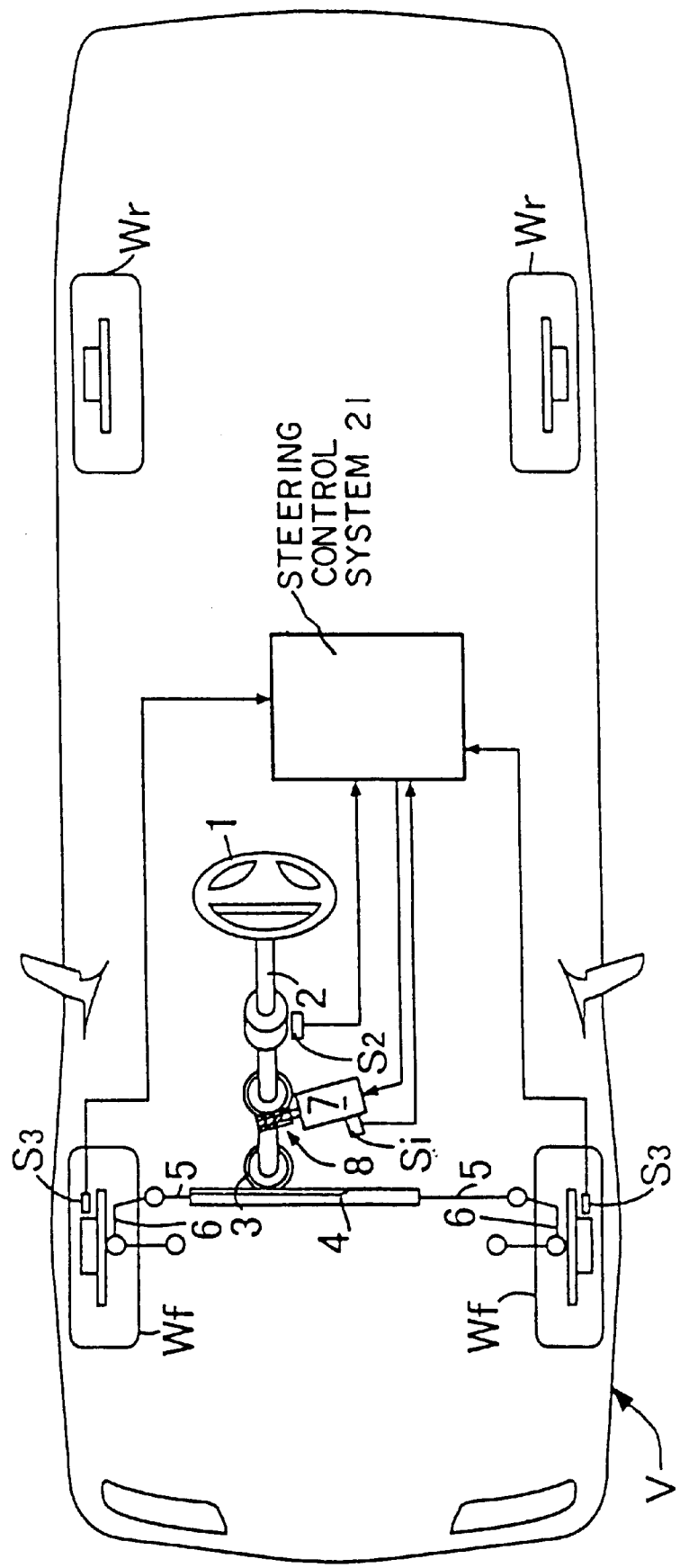
FIG. 1 is a schematic drawing of the entire arrangement of a vehicle equipped with a steering control system according to a first embodiment of the present invention.

As shown in FIG. 1, a vehicle V includes a pair of front wheels Wf, Wf and a pair of rear wheels Wr, Wr. A steering wheel 1 and the front wheels Wf, Wf which are the steering wheels, are interconnected by a steering shaft 2 rotated in unison with the steering wheel 1. A pinion 3 is provided at a lower end of the steering shaft 2, and a rack 4 meshes with the pinion 3. Left and right tie rods 5 are provided at opposite ends of the rack 4, and left and right knuckles 6 are connected to the tie rods 5. An electric motor 7 functioning as a steering actuator, is connected to the steering shaft 2 through a worm gear mechanism 8, in order to assist the driver in the operation of the steering wheel 1.

Connected to a steering control system 21 including a microcomputer, are a steering torque detecting means $S_1$ for detecting a steering torque T of the steering wheel 1, vehicle speed detecting means $S_3$, $S_3$ for detecting the vehicle speed v from the time interval of a pulse generated in accordance with the rotational angle of the left and right front wheels Wf, Wf, and a current detecting means Si for detecting current i supplied to the electric motor 7. The vehicle speed v may be determined from the number of revolutions of an input shaft or an output shaft of a transmission which is not shown. The steering torque detecting means $S_2$ functions as a steered-amount detecting means in the present invention, and the current detecting means Si functions as an operational state detecting means in the present invention.

Figure 2:
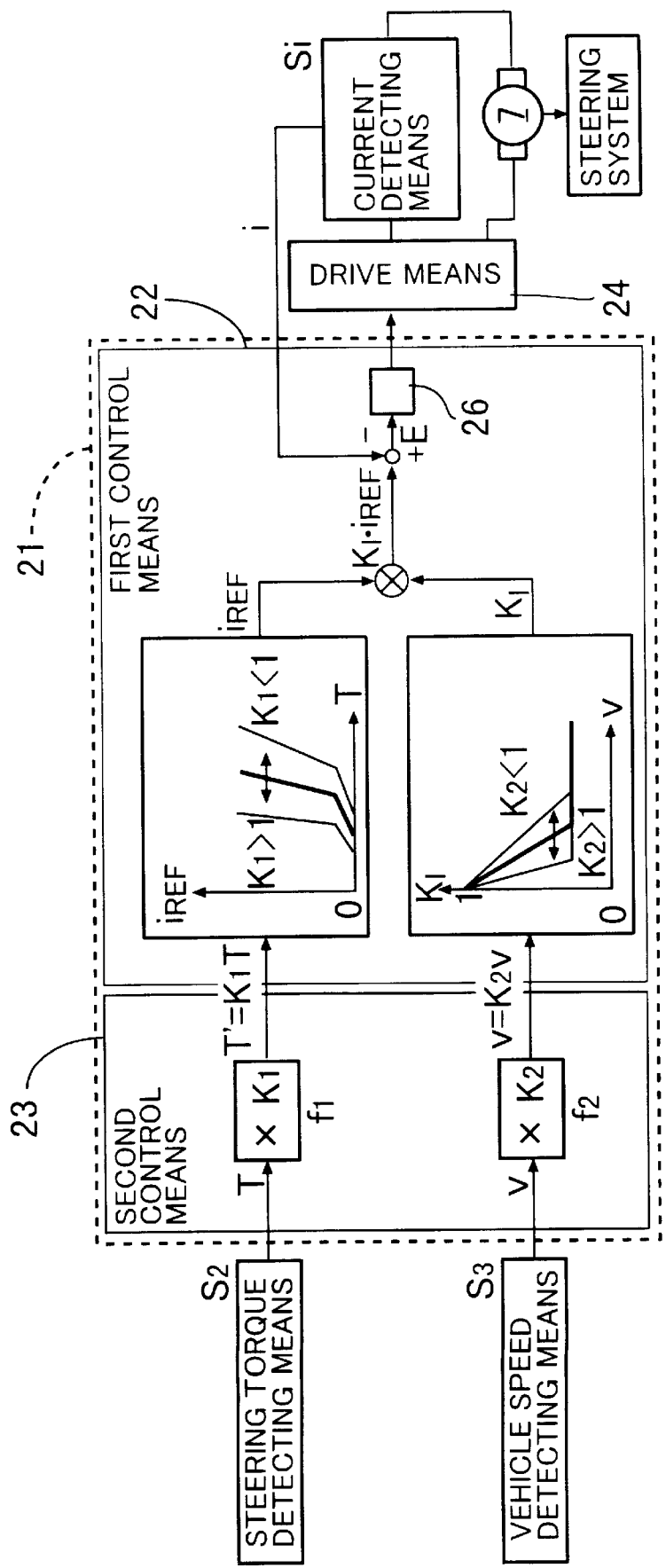
FIG. 2 is a diagram showing the arrangement of the steering control system.

As shown in FIG. 2, the steering control system 21 comprises a first control means 22 having a control means for a regular electric power-steering device, a second control means 23 detachably added to the first control means 22, and a drive means 24 having a power drive unit for driving the electric motor 7 on the basis of the output from the first control means 22. The second control means 23 is connected between the steering torque detecting means $S_2$ for detecting the steering torque T as well as the vehicle speed detecting means S3, S3 for detecting the vehicle speed v and the first control means 22. Thus, the steering torque T and the vehicle speed v changed in the second control means 23, are inputted to the first control means 22.

In the prior art steering control system having no second control means 23, i.e., in the prior art steering control system in which the steering torque T and the vehicle speed v are inputted directly to the first control means 22 without passing through the second control means 22, a control which will be described below is carried out in the first control means 22. When a driver operates the steering wheel 1, a reference current $i_{REF}$ to be applied to the electric motor 7, is searched from a reference current map on the basis of the steering torque T detected by the steering torque detecting means $S_2$, and a gain $K_1$ is searched from a gain map on the basis of the vehicle speed v detected by the vehicle speed detecting means $S_3$, $S_3$. The reference current $i_{REF}$ and the gain $K_1$ are multiplied by each other in a multiplying circuit. On the other hand, a current i supplied to the electric motor 7 is detected by the current detecting means Si, and the supplied current i is subtracted from a product of the reference current $i_{REF}$ and the gain $K_1$ by a subtracting circuit, thereby calculating a deviation E. The drive means 24 controls the electric motor 7 in a feedback manner through a controller 26 to converge the deviation to zero, thereby assisting in the driver's steering operation.

On the other hand, in the present embodiment, the second control means 23 corrects the steering torque T detected by the steering torque detecting means $S_2$ into T'=$f_1$ (T) by a predetermined relational expression $f_1$, and corrects the vehicle speed v detected by the vehicle speed detecting means $S_3$, $S_3$ into v'=$f_2$ (v) by a predetermined relational expression $f_2$. For example, if the relational expressions $f_1$ and $f_2$ are simply represented by factors $k_1$ and $k_2$, the steering torque T detected by the steering torque detecting means $S_2$ is multiplied by the predetermined factor $k_1$, whereby the steering torque is corrected, and the vehicle speed v detected by the vehicle speed detecting means $S_3$, $S_3$ are multiplied by the predetermined factor $k_2$, whereby the vehicle speed v is corrected. If the steering torque T is changed in an increasing direction, the reference current $i_{REF}$ searched from the reference current map is increased relative to an actual steering torque and hence, the assisting force provided by the electric motor 7 is increased to decrease the steering reaction force received by the driver. If the steering torque T is changed in a decreasing direction, the reference current $i_{REF}$ searched from the reference current map, is decreased relative to the actual steering torque and hence, the assisting force provided by the electric motor 7 is decreased to increase the steering reaction force received by the driver. If the vehicle speed v is changed in an increasing direction, the gain $K_1$ searched from the gain map is decreased relative to the actual steering torque and hence, the assisting force provided by the electric motor 7 is decreased to increase the steering reaction force received by the driver. If the vehicle speed v is changed in a decreasing direction, the gain $K_1$ searched from the gain map, is increased relative to the actual steering torque and hence, the assisting force provided by the electric motor 7 is increased to decrease the steering reaction force received by the driver.

Thus by adding only the second control means 23 to the first control means 22 provided in the prior art electric power-steering device, as described above, the characteristic of the electric power-steering device can be changed as desired, while utilizing the first control means 22 without modification. Thus, it is possible to accommodate a plurality of control modes at a minimum cost.

A second embodiment of the present invention will be described with reference to FIGS. 3 and 4.

The second embodiment is different from the first embodiment in the arrangement of the second control means 23. More specifically, the second control means 23 includes a second reference current map and a second gain map for ensuring that the electric power-steering device has a predetermined feature. A reference current $i_{REF}$' is searched from the second reference current map on the basis of the detected steering torque T, and a gain $K_1$' is searched from the second gain map on the basis of the detected vehicle speed v.

The reference current $i_{REF}$' and the gain $K_1$' are converted into a pseudo steering torque T' and a pseudo vehicle speed v', so that a reference current $i_{REF}$ and a gain $K_1$ are provided in the first control means 22, using data maps provided by inverting axes of the first reference current map and the first gain map stored in the first control means 22. By utilizing the pseudo steering torque T' and the pseudo vehicle speed v' for the first reference current map and the first gain map in the first control means 22 in the above manner, the reference current $i_{REF}$ and the gain $K_1$ can be provided, thereby ensuring that the electric power-steering device has the predetermined characteristic. In this method, however, it is impossible to ensure that the electric power-steering device has a gain characteristic such that $K_10 > K_1\cdot 0$.

Figure 3:
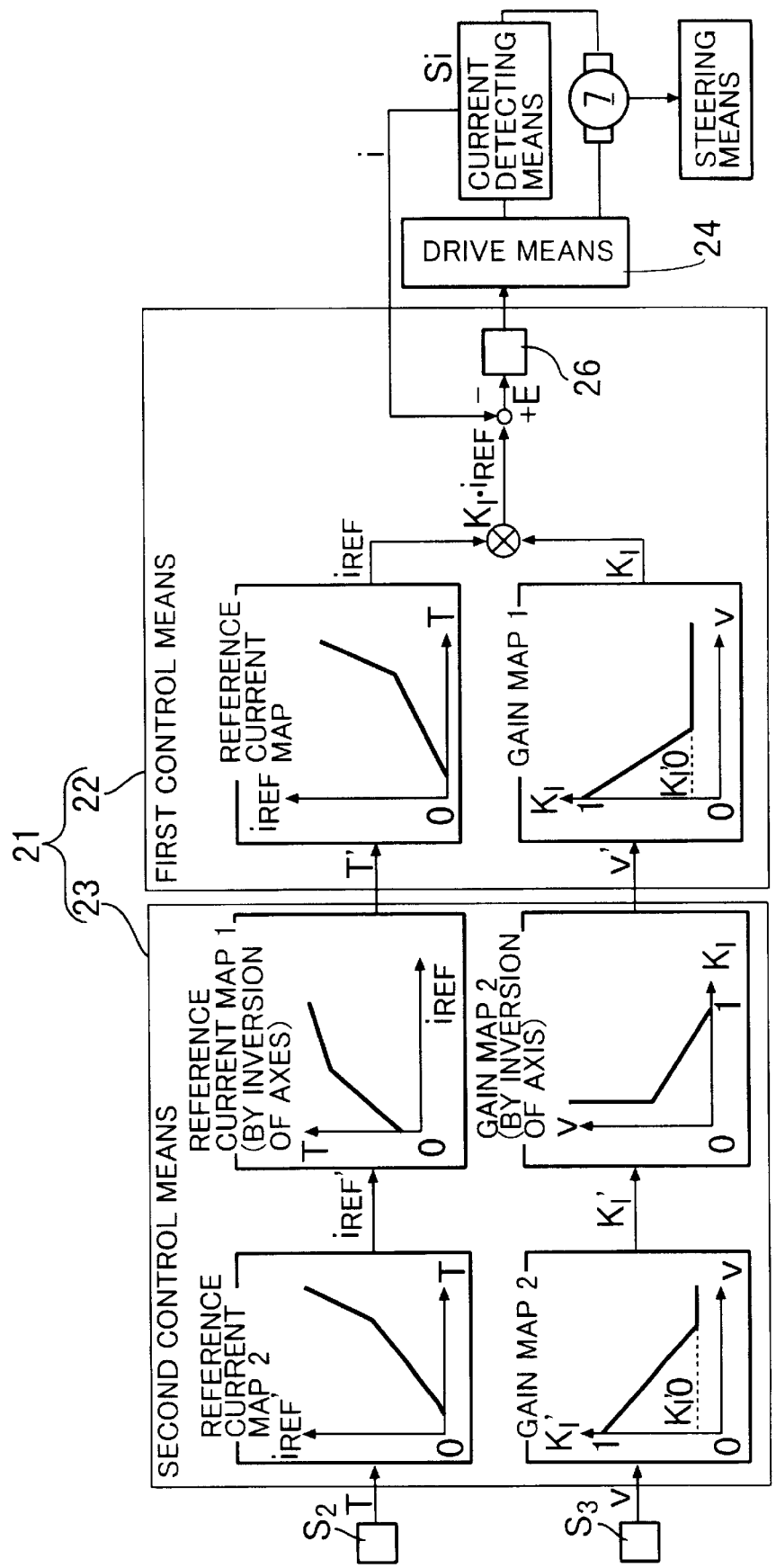
FIG. 3 is a diagram showing the arrangement of a steering control system according to a second embodiment of the present invention.
Figure 4:
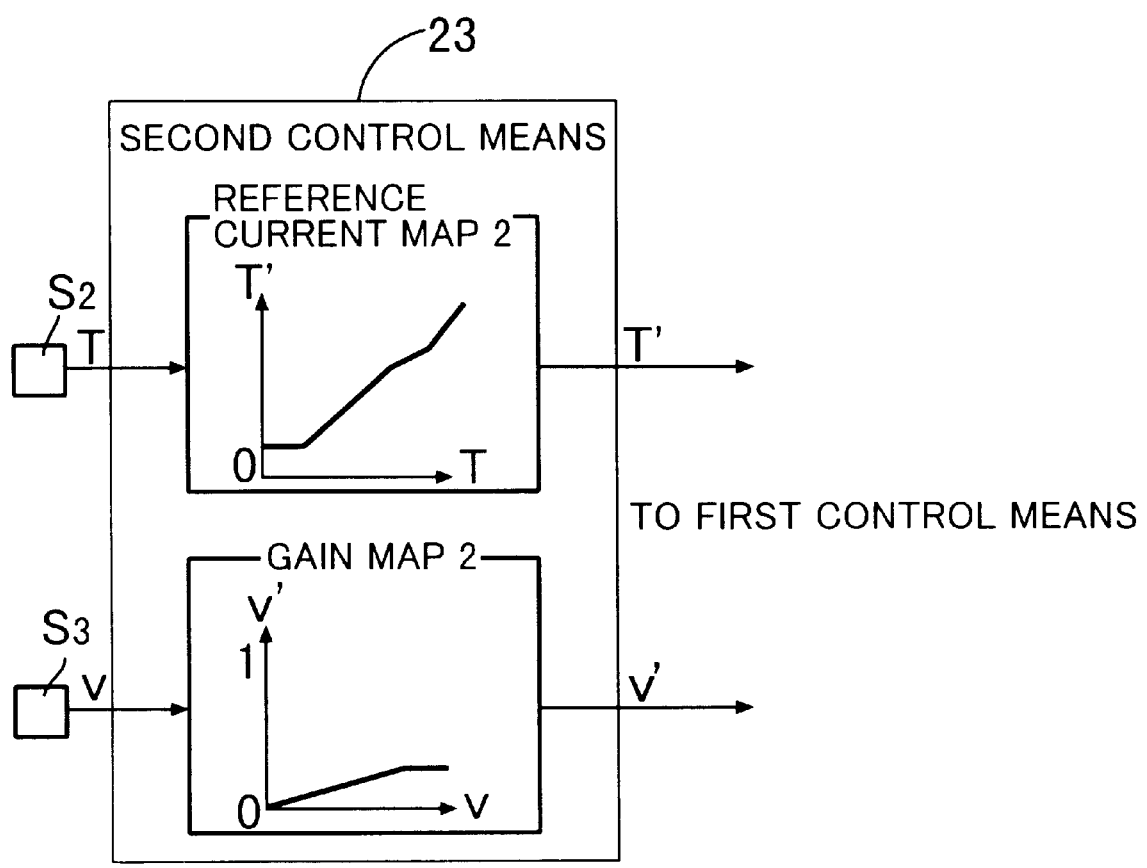
FIG. 4 is a diagram showing a modification to the second embodiment.

If the second reference current map and the first reference map provided by the inversion of the axis in FIG. 3 are brought together and the second gain map and the first gain map provided by the inversion of the axis in FIG. 3, are brought together, it is possible to ensure that the electric power-steering device has a predetermined characteristic in the two data maps.

Figure 5:
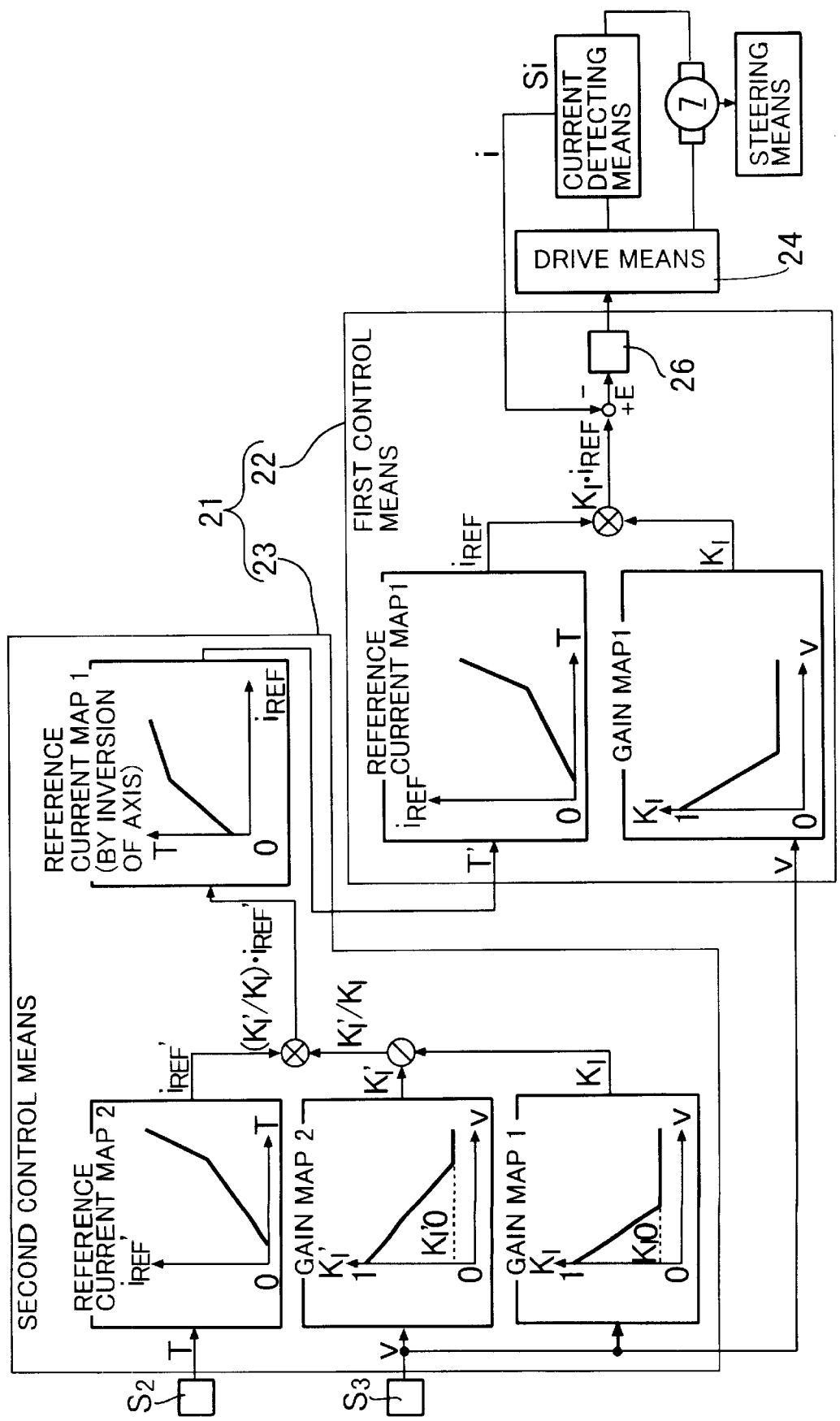
FIG. 5 is a diagram showing the arrangement of a steering control system according to a third embodiment of the present invention.

A third embodiment of the present invention will now be described with reference to FIG. 5.

In the third embodiment, the steering torque T is corrected on the basis of the second reference current map, the first gain map and the second gain map in the second control means 23 and then, the steering torque T is converted into a pseudo steering torque T, so that a reference current $i_{REF}$ is provided in the first control means 22, using a data map provided by the inversion of the axis of the first current map. At this time, the correction of the vehicle speed v is not carried out in the second control means 23.

With this embodiment, it is possible to ensure that the electric power-steering device has a gain characteristic such that $K_10 > K_1\cdot 0$.

Figure 7A:
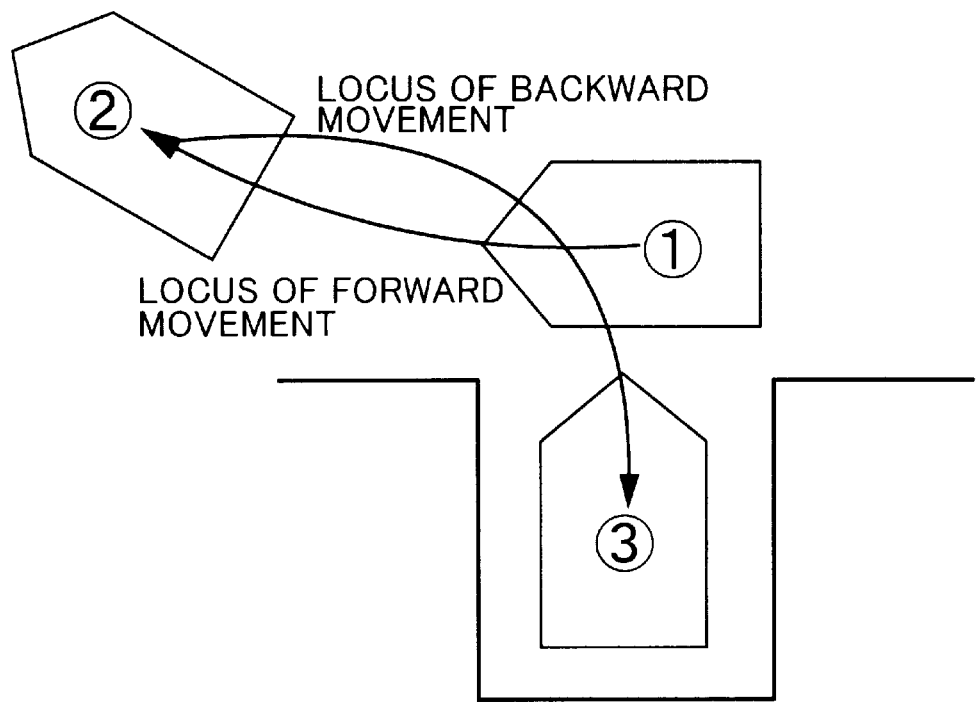
FIGS. 7A and 7B are illustrations for explaining the operation in a reverse parking/left mode.
Figure 7B:
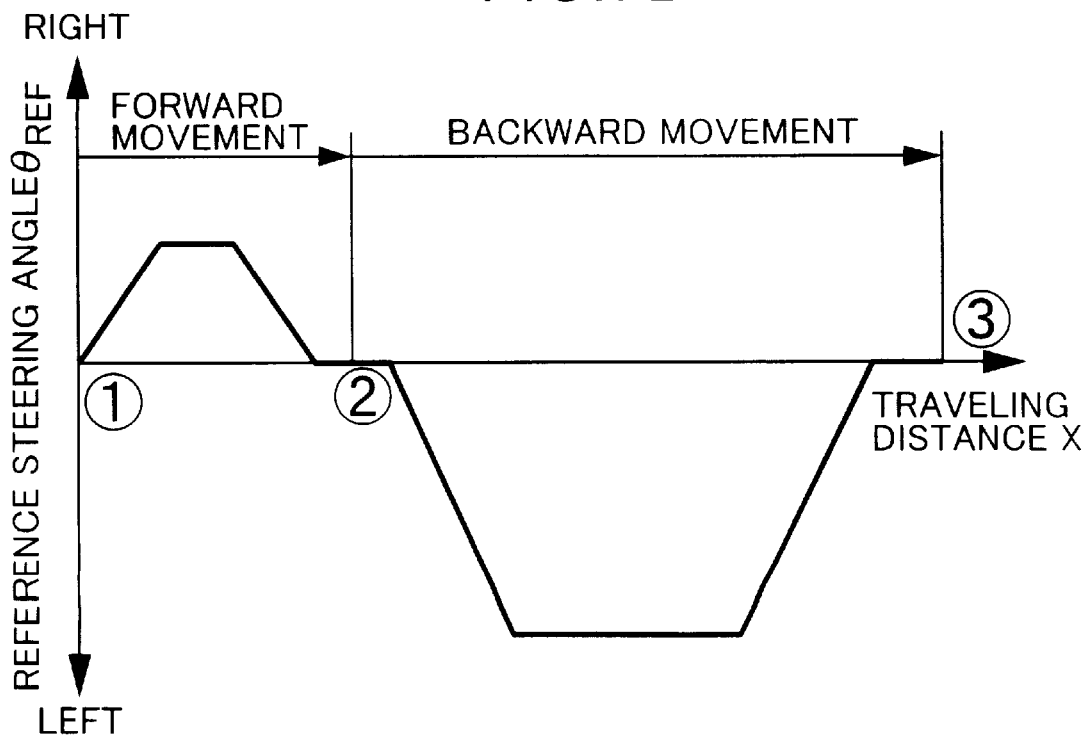
Figure 8:
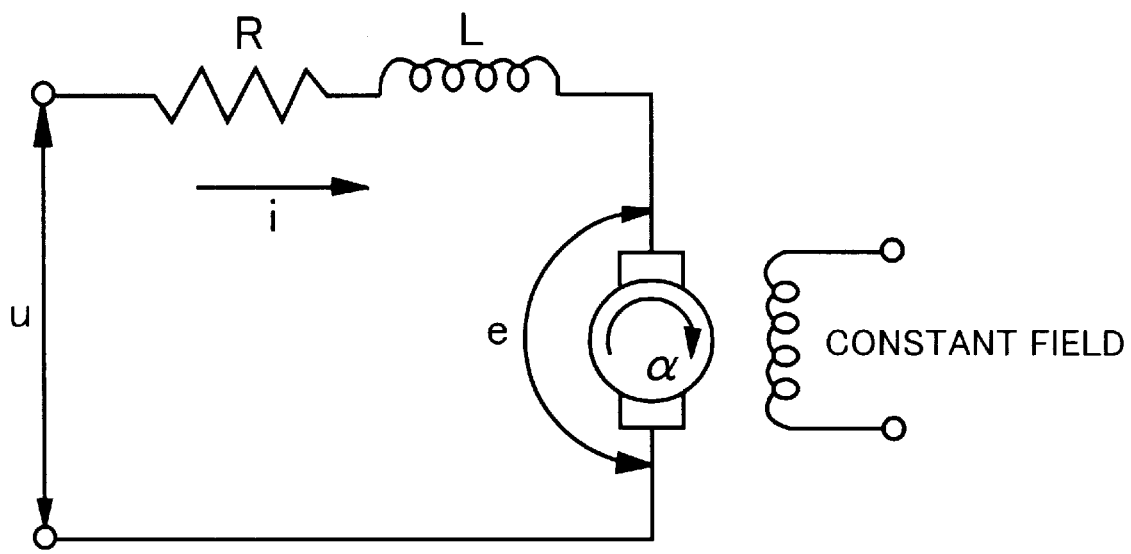
FIG. 8 is an illustration of a model for an electric motor.

FIGS. 6 to 9 show a fourth embodiment of the present invention. FIG. 6 is a diagram showing the arrangement of a steering control system according to the fourth embodiment; FIG. 7 is an illustration for explaining the operation in a reverse-parking/left mode; and FIG. 8 is a diagram showing a model of an electric motor. The fourth embodiment includes the function of an automatic steering device added to the electric power-steering system according to the first embodiment.

As can be seen from FIG. 6, a second control means 23 added to a first control means 22 which is a control means for a regular electric power-steering device, includes a storage means 25. Data of the following four parking modes are stored in the storage means 25 as a table showing the relationship of the reference steering angle $\theta_{REF}$ relative to the traveling distance X of the vehicle V for a reverse parking/right mode; a reverse parking/left mode; a longitudinal parking/right mode; and a longitudinal parking/left mode. The traveling distance X of the vehicle V may be determined by integrating the vehicle speeds v detected by the vehicle speed detecting means $S_3$, $S_3$, or may be determined from the number of pulses generated with the rotation of the wheel and the radius of a tire.

The second control means 23 calculates a rotational angle a of the electric motor 7, i.e., a steering angle θ of the front wheels Wf, Wf which is in a given relation to the rotational angle α on the basis of a supplied current i and a terminal voltage u to the electric motor 7 detected by a current detecting means Si and a voltage detecting means Su which functions as an operational state detecting means for the electric motor 7; determines a drive current for driving the electric motor 7, so that a deviation between the steering angle θ and the reference steering angle $\theta_{REF}$ becomes zero; and outputs the drive current from a controller 27. Then, a steering torque T to be outputted to the first control means 22 is searched from a reference torque map in order to provide the drive current. The vehicle speed v during automatic parking of the vehicle is extremely low and hence, the vehicle speed v is set at zero for the purpose of simplifying the control. Then, the steering torque T and the vehicle speed v are inputted to the first control means 22, and a reference current $i_{REF}$ and a gain $K_1$ are searched on the basis of a reference current map and a gain map. The drive means 24 is driven through the controller 26 on the basis of the reference current $i_{REF}$ and the gain $K_1$, thereby supplying the drive current i equal to $K_1 \cdot i_{REF}$ to the electric motor 7. In this manner, automatic steering is carried out so that the steering angle θ is equal to the reference steering angle $\theta_{REF}$.

When the vehicle is in a usual state in which the automatic steering is not carried out, the second control means 23 outputs the steering torque T and the vehicle speed v to the first control means 22 without correction of them, and the steering control system 21 functions as a regular electric power-steering device adapted to control the driving the electric motor 7 on the basis of the steering torque T and the vehicle speed v.

On the other hand, for example, when the reverse parking/left mode (the mode in which the vehicle V is parked while being moved backwards to a parking position on the left of the vehicle V is carried out), the vehicle V is first moved near a garage where the vehicle V is to be parked, with the left side of the vehicle body located as close as possible to an inlet line of the garage, as shown in FIG. 7A. In this state, the vehicle V is stopped at a position (a start position (1)) at which a predetermined reference point (e.g., a left sideview mirror) is matched with a center line of the garage. When a mode selecting switch (not shown) is operated to select the reverse-parking/left mode from the four modes, and an automatic parking start button (not shown) is turned on, the automatic parking control is started. While the automatic parking control is being conducted, the front wheels Wf, Wf are automatically steered on the basis of data of the selected reverse parking/left mode and the vehicle is operated at a creeping speed by the driver, even if the steering wheel 1 is not operated. More specifically, while the vehicle V is being moved forwards from the start position (1) to a reversing position (2), the front wheels Wf, Wf are automatically steered to the right. While the vehicle V is being moved backwards from the reversing position (2) to a parking-complete position (3), the front wheels Wf, Wf are automatically steered to the left.

As can be seen from FIG. 7B, while the automatic steering is being carried out, the second control means 23 calculates a deviation ($\theta_{REF} - \theta$) on the basis of the reference steering angle $\theta_{REF}$ in the reverse parking/left mode previously stored in the storage means 25 and the steering angle θ calculated from the rotational angle α of the electric motor 7, and controls the operation of the electric motor 7 through the first control means 22, so that the deviation is equal to 0 (zero). At this time, data of the reference steering angle $\theta_{REF}$ is set in correspondence to the traveling distance X of the vehicle V and hence, even if there is a variation in vehicle speed while creeping, the vehicle V is always moved on the locus of movement.

A technique for calculating the rotational angle α of the electric motor 7 (namely, the steering angle θ) from the terminal voltage u and the supplied current i to the electric motor 7 will be described below with reference to FIG. 8.

In a model of the electric motor 7 shown in FIG. 8, the terminal voltage is represented by u; the supplied current by i; the resistance by R; the inductance by L; the counter electromotive force by e; and the rotational angle by α. The terminal voltage u is represented by the following equations:

$$u = L\frac{di}{dt} + Ri + e \tag{1}$$

-continued $$e = K\frac{d\alpha}{dt} \quad (2)$$

wherein K is a constant depending on the characteristic of the electric motor 7.

From the above equations (1) and (2), the rotational angle α is calculated according to:

$$\alpha = \int \frac{d\alpha}{dt} dt \quad (3)$$
$$= \frac{1}{K} \int \left(u - L\frac{di}{dt} - Ri\right) dt$$

In the equation (3), the inductance L can be omitted, because it is generally small. As a result, the equation (3) can be represented by the following equation:

$$\alpha = \frac{1}{K} \int (u - Ri) dt \quad (4)$$

As apparent from the equation (4), if the constants R and K are determined, the rotational angle α can be calculated based on the terminal voltage u and the supplied current i. The rotational angle α of the electric motor 7 and the steering angle θ of the front wheels Wf, Wf are in a given relationship to each other and hence, the steering angle θ of the front wheels Wf, Wf can be calculated based on the rotational angle α of the electric motor 7. Moreover, the voltage detecting means Su and the current detecting means Si are basically mounted in a standard electric power-steering device and hence, a special cost for mounting them is not required.

Thus, the function of the automatic steering device can be added while utilizing the first control means 22 without modification, only by adding the second control means 23 to the first control means 22 mounted in the prior art electric power-steering device. Therefore, it is possible to accommodate a plurality of control modes at the minimum cost.

A fifth embodiment of the present invention will be described below with reference to FIG. 9.

The steering angle θ is calculated on the basis of the supplied current i and the terminal voltage u to the electric motor 7 in the fourth embodiment, but the steering angle θ is directly detected by a steering angle detecting means $S_1$ in the fifth embodiment. The steering angle detecting means $S_1$ comprises, for example, an encoder for detecting the rotational angle of the steering shaft rotated in unison with the steering wheel 1, or a potentiometer for detecting the displacement of the rack 4. If the rotational angle of the steering shaft is known, the steering angle θ of the front wheels Wf, Wf mechanically connected to the steering shaft can be calculated. By directly detecting the steering angle θ of the front wheels Wf, Wf in the above manner, the accuracy of the obtained steering angle θ can be enhanced to further reliably reproduce the locus of movement of the vehicle, as compared with the case where the steering angle θ is presumed from the supplied current i and the terminal voltage u to the electric motor 7.

As discussed above, the steering control system for the vehicle including the first control means for controlling the electric motor on the basis of the steering amount provided by the driver's steering operation, the vehicle speed and the operational state of the electric motor further includes the second control means for controlling the first control means.

Therefore, it is possible to control the electric motor in the different modes by utilizing the control means for the existing electric power-steering system without modification to the existing system, thereby reducing the time and cost required for the development of the control means.

The second control means controls the first control means on the basis of the steering amount detected by the steering amount detecting means. Therefore, the assisting characteristic of the electric power-steering system can be easily changed.

The second control means controls the first control means on the basis of the vehicle speed detected by the vehicle speed detecting means. Therefore, the assisting characteristic of the electric power-steering system can be easily changed.

The second control means includes the movement locus setting means which stores or calculates the locus of movement of the vehicle, and the second control means controls the first control means to move the vehicle along the locus of movement. Therefore, it is possible to utilize the first control means which is common to the electric power steering system designed to assist in the driver's steering operation and the automatic steering system designed to move the vehicle along the set locus of movement, thereby reducing the time and cost required for the development of the control means.

The locus of movement is represented as the relationship of a reference steering angle of the wheel relative to the traveling distance of the vehicle, and the second control means controls the first control means to move the vehicle along the locus of movement on the basis of (1) the traveling distance of the vehicle calculated based on the vehicle speed, (2) the steering angle of the wheel presumed based on the operational state of the electric motor, and (3) the locus of movement.

With the above arrangement, the vehicle speed and the operational state of the electric motor used for the control of the electric power-steering system can be also used for the control of the automatic steering system The locus of movement is represented as the relationship of a reference steering angle of the wheel relative to the traveling distance of the vehicle, and the second control means controls the first control means to move the vehicle along the locus of movement on the basis of (1) the traveling distance of the vehicle calculated based on the vehicle speed, (2) the steering angle of the wheel detected by the steering angle detecting means, and (3) the locus of movement. Therefore, the steering angle can be accurately detected to accurately move the vehicle along the locus of movement by detecting the steering angle of the wheel by the steering angle detecting means, as compared with the case where the steering angle of the wheel is presumed on the basis of the operational state of the electric motor.

Although the embodiments of the present invention have been described in detail, it will be understood that the present invention is not limited to the above-described embodiments, and various modifications may be made without departing from the subject matter of the present invention.

We claim:

1. A steering control system for a vehicle, comprising:
    an electric motor for steering a wheel,
    a steering amount detecting means for detecting the steering amount provided by a driver's steering operation,
    a vehicle speed detecting means for detecting the vehicle speed, an operational state detecting means for detecting the operational state of said electric motor, a first control means for controlling said electric motor on the basis of said steering amount, said vehicle speed and said operational state, wherein said steering control system further includes a second control means for controlling said first control means, wherein said first control means is capable of controlling said electric motor on the basis of inputs of the actual steering amount, the actual vehicle speed and the actual operational state, and wherein said second control means is provided separately from and is connectable to the control system for the vehicle and produces at least one of a modified steering amount based upon the actual steering amount and a modified vehicle speed based upon the actual vehicle speed, and substitutes at least one of the modified steering amount and the modified vehicle speed for the actual steering amount and the actual vehicle speed for the inputs of the first control means.

2. A steering control system for a vehicle according to claim 1, wherein said second control means controls said first control means on the basis of the steering amount detected by said steering amount detecting means.

3. A steering control system for a vehicle according to claim 1 or 2, wherein said second control means controls said first control means on the basis of the vehicle speed detected by said vehicle speed detecting means.

4. A steering control system for a vehicle according to claim 1, wherein said second control means includes a movement locus setting means for storing a locus of movement of the vehicle, and said second control means controls said first control means to move the vehicle along said locus of movement.

5. A steering control system for a vehicle according to claim 1, wherein said second control means includes a movement locus setting means for calculating a locus of movement of the vehicle, and said second control means controls said first control means to move the vehicle along said locus of movement.

6. A steering control system for a vehicle according to claim 4 or 5, wherein said locus of movement is a relationship of a reference steering angle of the wheel relative to the traveling distance of the vehicle, and said second control means controls said first control means to move the vehicle along said locus of movement on the basis of the traveling distance of the vehicle calculated based on the vehicle speed, the steering angle of the wheel calculated based on the operational state of said electric motor, and said locus of movement.

7. A steering control system for a vehicle according to claim 4 or 5, wherein said locus of movement is a relationship of a reference steering angle of the wheel relative to the traveling distance of the vehicle, and said second control means controls said first control means to move the vehicle along said locus of movement on the basis of the traveling distance of the vehicle calculated based on the vehicle speed, the steering angle of the wheel detected by a steering angle detecting means, and said locus of movement.

8. A steering control system for a vehicle according to claim 1, wherein said second control means produces the at least one modified steering amount and modified vehicle speed by multiplying a constant to at least one of the actual steering amount and actual vehicle speed, respectively.

9. A steering control system for a vehicle according to claim 1, wherein said second control means includes a transformation function which is the inverse of a transformation function of the first control means.

10. A steering control system for a vehicle according to claim 1, wherein said second control means is detachable.

* * * * *